…

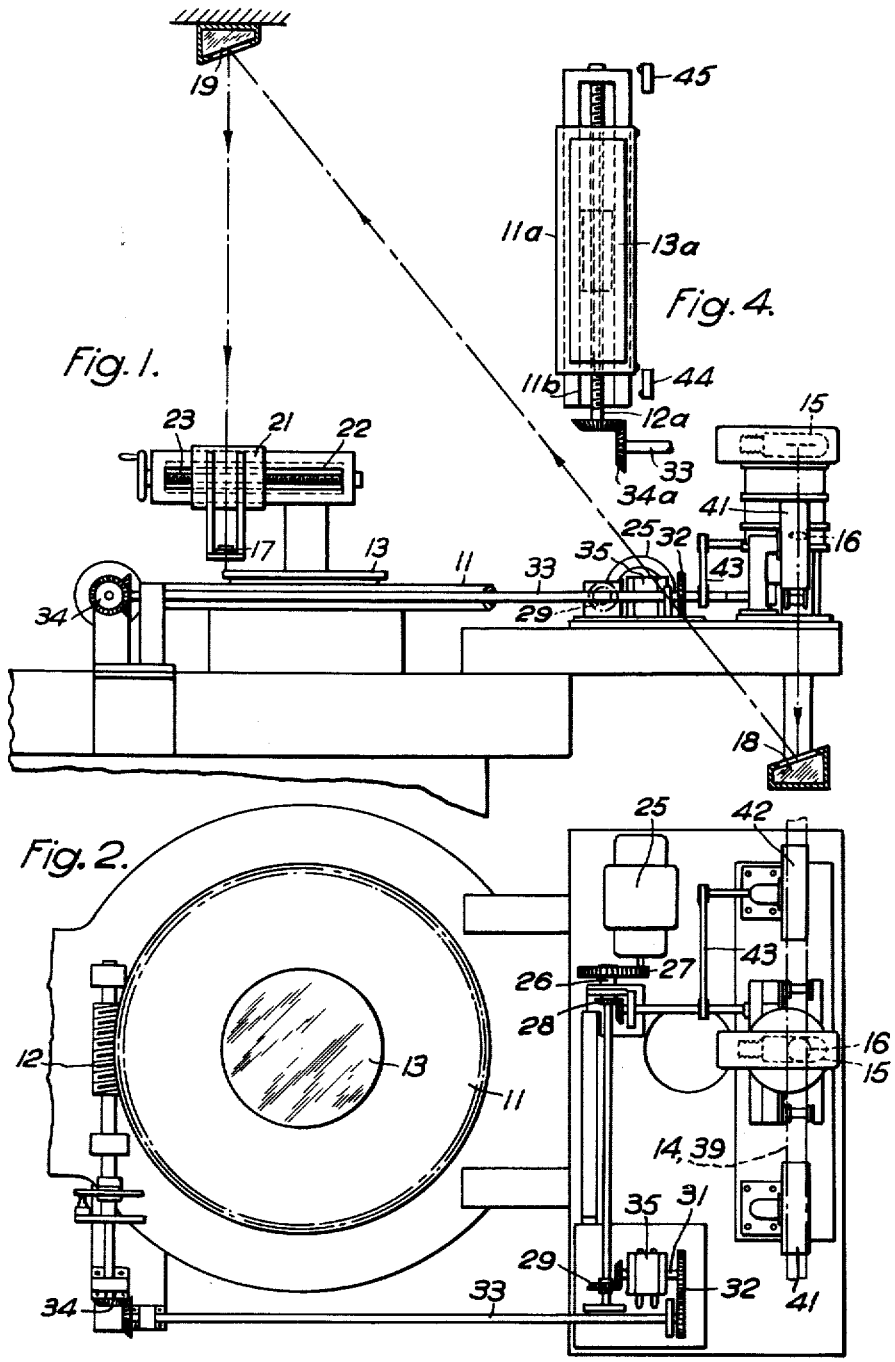

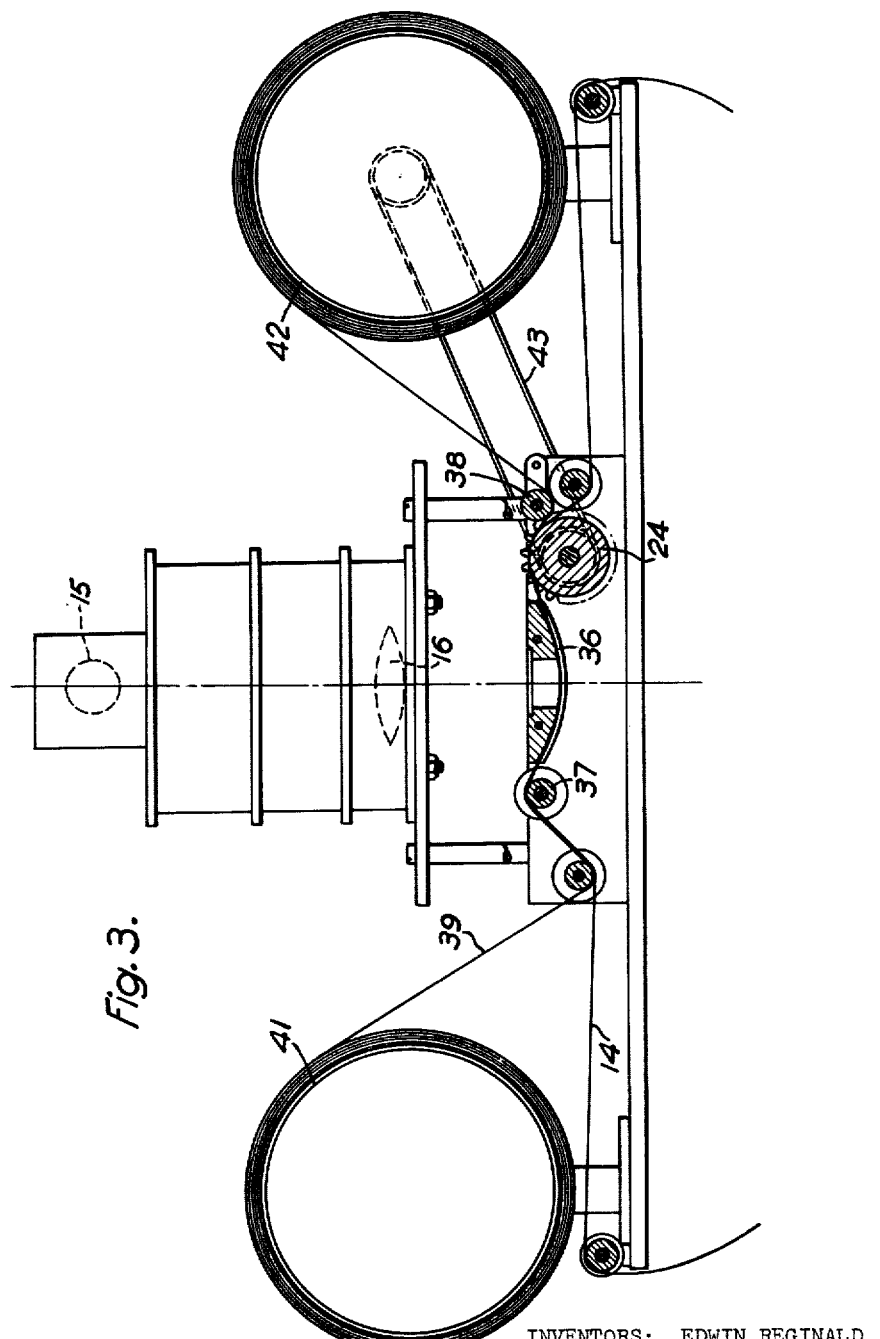

United States Patent Office 3,101,646
Patented Aug. 27, 1963

3,101,646
APPARATUS FOR PHOTOGRAPHICALLY FORMING CIRCULAR SCALES FROM LINEAR STRIPS
Edwin Reginald Dymott, Surbiton, and Ronald Graham Chalmers, East Molesey, England, assignors to National Research Corporation, London, England
Filed Oct. 7, 1958, Ser. No. 765,763
Claims priority, application Great Britain Oct. 10, 1957
6 Claims. (Cl. 88—24)

This invention relates to the making of scales, more especially of precision coded scales, i. e. areas of opacity and translucency in a predetermined order, on glass or other rigid material having a photographically sensitised surface, but is can also be used for producing graduations and figuring or numbering.

It has already been proposed to copy an optical sound record carried by a moving film on to another moving film of different size (e.g. from 35 mm. to 16 mm. film) by projection printing, the ratio of projection and relative speeds of the films being in exact accordance with the required relative sizes of the original and copy records. For the purpose in view in these prior proposals the method has the advantage that it can cope without difficulty with film in very considerable lengths running into hundreds of metres.

The present invention also employs projection printing at an appropriate ratio with continuous exposure while the sensitised surface and an original set of markings are continuously moved at appropriate relative speeds, but the scale to be produced is of relatively limited size and continuous motion is employed not to cope with great lengths (though the original set of markings may be of quite considerable length) but because it avoids well known disadvantages which are inherent in discontinuous systems of dividing. Also while the original marks move in a linear path the scale may be linear, cylindrical or circular.

In its broadest aspect the present invention has two characteristic features used in combination. The first is that the original set of markings is carried on a flexible strip, conveniently photographic films, which is digitally fed in a linear path by the aid of means coupled by positive gearing of good workmanship to precision means for moving the sensitised surface, and the second is that the projection ratio is high that is to say the ratio of reduction between the original and image is at least 20:1. A very suitable digital feed for the strip is by means of sprocket holes and a sprocket. The first characteristic obviously ensures that the average speeds of the strip and sensitised surface are held in a definite ratio but provided the sprocket holes and sprocket are of good workmanship such as is standard in the kinematograph industry and the other gearing is of comparable quality, in the case of a continuously moving strip the errors in the movement of the strip are such that provided also the final drive of the means for moving the sensitised surface is of precision quality and of high reduction ratio, the effect of these errors is negligible and in conjunction with the second characteristic enables scales of very high quality to be produced by the present invention.

The second characteristic feature namely a high ratio of reduction (which may be substantially greater than 20:1 say of the order of 100:1) has the advantages not only that the original is on a relatively large scale which makes for convenience in preparing it, but also and more important that the mechanical errors which are mainly in the transport of the strip are brought down at the location of the scale to values within the limits imposed by optical and photographic considerations. These advantages apply to circular, cylindrical and straight line scales but there is a further advantage due to this second characteristic which applies to circular scales only.

In all cases if the width of the aperture covered in the direction of transport by the projection lens at the location of the moving original is $a$ and the ratio of reduction is $m$ the corresponding size of the image at the sensitised surface will be $a/m$. Thus while a point on the original moves through the distance $a$ its image will move through a distance $a/m$. The means for moving the original and the sensitised surface should be geared together in the same ratio $m$. However though ideally there should be a sharp transition between opacity and clearness in the recorded scale, transitions of this character cannot be obtained in practice because on one hand photographic material cannot yield such results and on the other hand no optical system can produce a true point image. Some spread in the recorded image must be expected and it represents a boundary of transition between opacity and clearness in the image. If the spread is over a distance $x$ it is sufficient that the image and the sensitised surface vary relatively in speed by not more than $100xm/a$ percent. Furthermore the properties of photographic emulsions particularly those of high contrast which are most suitable for the present purpose are such that effective spread is reduced in the photographic image so that a greater error can be accepted before the quality of the scale deteriorates below the limit corresponding to the value $x$. Also the value of $x$ can be controlled by adjusting the value of $a$.

If the scale being made is a straight line or cylindrical scale manifestly the gear ratio must be correct but the two characteristic features of the method reduce the effect of such errors as are bound to be present in film transport and transmission gearing of good workmanship, to a value which is negligible in comparison with those of the final drive of a precision feed motion of the highest quality.

In the case of a circular scale the ratio of the gearing must be correct so that the average angular speed of the scale is correctly related to the average linear speed of the original markings but as compared with linear scales the radius at which the recording is done must also be taken into account. In this respect however the considerations discussed above enable a satisfactory result to be obtained notwithstanding the errors of film transport and transmission gearing of good workmanship but also not withstanding the errors which can arise due to variations in the linear speed of the sensitised surface with radius from the axis of rotation, that is to say satisfactory results can be obtained not only at the radius at which the linear speed is nominally exactly correct but also over a range of radius which corresponds to a scale of reasonable width so that such a scale can be made without change of gear ratio. Indeed for many purposes satisfactory results can be obtained over a greater width thus enabling several scales to be recorded side by side without change of gear ratio. The smaller $a$ defined above is made, the greater the range of radius which can be covered without change of ratio. With the large ratio of reduction here contemplated the width of any one trace on the plate will usually be narrower than is desired. A scale of desired width can be built up by making a number of traces side by side and it will be clear that in the case of a circular scale as well as a linear scale this can be done without change of ratio.

In the case of a circular scale no change needs to be made for a small change in radius but each time there is a substantial change of radius some change must be made. Depending on the nature of the scale and the original markings it may be more convenient to change the ratio of the gearing, the ratio of reduction in the optical system or to use an original set of markings on a different scale, or to use any two or all three of these possibilities.

Where a given set of markings is repeated on the scale (which is the case for example in scales conventionally divided as well as in cyclic codes) a length of strip carrying one or more repeats may be conveniently formed into an endless loop which is circulated through the image forming system during the making of the scale. Where long lengths of opacity or translucency or of both are required they can conveniently be assembled by splicing, or otherwise joining, pieces cut from a supply of opaque and translucent film in the desired order, arranging that the transitions occur at the correct distances related to the sprocket holes (or other registration marks). Where a number of closely spaced areas, lines, patterns, numbers or letters or combinations of these are required it is convenient to print them photographically from drawings or assemblies of elements, e.g. bricks painted black and white or bearing numbers, on pieces of film which can then be joined together at the appropriate spacings.

Other possibilities are to draw the markings to be copied directly on the film with pen and ink, and to punch holes in an opaque film or other opaque flexible strip with sprocket holes. As before the strip can be in pieces joined together as may be required.

The invention described has considerable advantages when codes of elaborate type are being used or where intervals are irregular. Nevertheless it is also useful for the preparation of conventional dividend scales with close divisions and also to cases where the scale is no more than a succession of equally spaced opaque bands, in other words an optical grating. It enables radial optical gratings that is to say gratings in which the lines and spaces extend radially on an annular surface, of high quality with quite fine spacing e.g. 5,000 per linear inch to be prepared.

Another possibility in recording on a plate which is rotated is that by providing a slow radial feed a spiral scale that is to say a scale extending over more than one revolution can be made, since as above pointed out the present invention can cope with a range of radii without the gear or other factors needing to be changed. As before such a spiral scale can be made up of several traces side by side. Similarly a helical scale can be made on a cylinder by feeding the cylinder or lens axially during recording.

The sensitised surface upon which the scale is produced is desirably one of high resolution when suitably processed. Photographic emulsions having this quality are generally of low sensitivity and have small exposure latitude. It becomes desirable therefore to use a powerful light source and to control the exposure. When the apparatus is moving steadily constant exposure conditions are easily maintained but at the beginning and end of the operations difficulties may arise especially since a powerful light source usually cannot be switched on instantaneously. To provide for this an opaque leader and an opaque trailer may be associated and moved with the strip carrying the original markings, respectively extending up to the beginning and from the end of the scale or part of the scale which is to be photographed, the leader and trailer being of such length as to provide time for the switching on and off of the lamp or the opening and closing of a shutter. Then the illumination of the strip carrying the markings commences before the period of exposure of the sensitised surface and ceases after it but the exposure of the sensitised surface is limited exactly to the correct period and can be of uniform intensity giving a uniformly dense image.

Where the complete scale or the part of it to be photographed is on a film strip not in the form of a loop, the leader and trailer may be directly attached to or more conveniently form part of the film itself so that no synchronizing problem arises. When the film strip is in loop form the leader and trailer may be on a separate masking film having a clear portion between them equivalent to the length of the scale or part of the scale to be photographed and synchronization is obtained by passing both through the gate together and transporting them by the same sprocket or separate sprockets suitably geared together.

Such a masking film can also be used for other purposes for example for avoiding difficulties due to joints in translucent parts of the film strip carrying the original markings. Such joints are not as translucent as the clear film and the masking film may be arranged to obscure such joints during a first exposure. A second exposure is then made of only these obscure parts. This can be done by relatively displacing the two films or by using a separate film or films to fill up the areas which were masked in the first exposure. In general only two exposures would be necessary and it would often be convenient to have the masking film of equal lengths of opaque and clear so that it would only need to be displaced one such length and only one masking film would be needed. In some cases, e.g. of repetitive patterns, the same film strip bearing the marks to be photographed could also be used.

The invention will be further described with reference to the accompanying diagrammatic drawings in which FIGURE 1 is a schematic front view of an apparatus for producing circular or cylindrical scales, FIGURE 2 is a plan view of FIGURE 1 with the horzontal guideway and carriage removed, FIGURE 3 is a detail side view on a larger scale showing the film transport mechanism, and FIGURE 4 is a schematic detail of an arrangement for the production of linear scales.

The apparatus shown in FIGURES 1 to 3 embodies a table 11 journalled for rotation on a vertical axis and having teeth cut in its periphery in which meshes a worm 12. Such table and worm may conveniently be parts of a conventional circular dividing engine. A sensitised photographic glass plate 13 is carried on the table so as to rotate therewith.

A length of film 14 carrying the required markings passes through a beam of light which is derived from a lamp 15 by means of a condenser lens 16 and this beam reaches a projection lens 17 which serves to image the markings on the plate 13 at the required diminution. The ratio of diminution is of the order of 100:1 and for convenience the lamp and condenser are arranged vertically above the film which is to one side of the table 11 and the beam is twice redirected by mirrors 18, 19. The projection lens 17 is supported on a carriage 21 guided on a horizontal guideway 22 under the control of a micrometer screw 23 which enables the image to be adjusted in a radial direction in relation to the plate 13. The projection lens 17 should be a lens of high quality such as a well corrected photographic objective. Also the illuminated field of the film should have a substantial diameter say one inch in the case of conventional 35 mm. film, and the lamp 15 should provide a source of substantial area. A suitable type of lamp is a ribbon filament lamp. The condenser 16 should also be a good quality lens such as a moderately well-corrected photographic objective.

The two mirrors 18, 19 constitute a simple means for folding the beam. It is essential that there should be no obstructions in the beam and in any particular case it may be necessary to use more mirrors to carry the beam round the parts of the apparatus. Small radial movements of the carriage 21 such as are required to record several tracks forming one scale are covered by the field provided by the condenser 16 at the projection lens 17, but to provide for larger movements an additional mirror or mirrors may be desirable to enable the length of the optical path to be adjusted without changing the tilt of the mirrors but if preferred the mirrors 18, 19 may be adjustable in position and angle.

The film 14 is fed by means of a sprocket 24 which is coupled mechanically to the worm 12 the ratio of the coupling being such that the image of the film on the plate 13 and the part of the plate on which the image is formed have no relative motion or a relative motion which does not produce a spread of more than $x$, where $x$ is the value above discussed. In this way the markings on the film 14 are imaged on the plate 13 at the required size with sufficient sharpness to obtain a scale of as good quality as the photographic material will allow. Since the ratio of reduction is high, with a practical apparatus the lens 17 is of short focal length and it is essential therefore to ensure that the distance from it to the plate 13 remains constant at all points of the record within close limits.

The figures show a convenient lay-out of transmission gearing which enables the ratio to be changed to suit the radius on which the recording is effected. Since it is desirable that the speed of operation should remain substantially constant to avoid errors due to inertia and other mechanical effects and to keep the exposure constant, the drive is derived from an electric motor 25 which is preferably a suitably controlled servo motor or a synchronous motor. This drives a shaft 26 through spur reduction gearing 27. A pair of spiral bevel gears 28 transmits drive from the shaft 26 to the sprocket 24. At the other end the shaft 26 through another pair of spiral bevels 29 drives an intermediate shaft 31 which through spur gears 32 drives a transverse shaft 33 whence through another pair of spiral bevels 34 the drive is transmitted to the worm 12. It will be understood that all the gearing should be of good quality so that the mechanical errors are small, these being reduced at the plate 13 by the optical reduction.

To enable the ratio easily to be changed the intermediate shaft 31 is journalled in a bearing 35 which can be adjusted parallel to the shaft 26, the appropriate wheel of the pair 29 being slidably keyed to the shaft 26 to permit such adjustment without interference with the drive. In this way the distance between the shafts 31 and 33 can be adjusted to enable any selected pair of gears 32 within a large range to be used.

The film 14 is led through the beam over a guideway 36 which is slightly curved to overcome the tendencies of film to curl. This enables it to be guided laterally by its edges against flanges on the guideway. The film is led to the guideway over a guide roller 37 and passes from the guideway over the sprocket 24. It is maintained in mesh with the sprocket by a roller 38 which may conveniently press by gravity. As shown it is assumed that the scale being recorded consists of repeats of the same pattern. The film 14 may then as shown be in the form of a loop but if a long pattern with no repeats or only with repeats of considerable length is being recorded instead of using a loop the film may be transferred from one reel to another; this may also be done in the case of short repeats. Such reels and the methods of driving them are well known; they can for example be similar to those described below for a masking film.

If a masking film is provided for the reasons above discussed, to avoid problems of synchronisation it may advantageously be fed by the same sprocket 24. Accordingly as shown in FIGURE 3 a masking film 39 runs between the film 14 and the guideway 36 and over the sprocket 24. This masking film runs from a storage reel 41 to storage reel 42 the latter being provided with a conventional slipping drive shown in the form of a belt 43 which is under light enough tension to slip when necessary. It will be understood that in any particular case if a comparatively short masking film is used it may be in loop form instead of passing from one reel to another.

In some cases the opaque elements at the ends of the scale on the film 14 itself may be long enough to serve the same function as the leader and trailer on the masking film. Then a masking film can be dispensed with and it is only necessary to arrange for the lamp 15 to be switched on and off or a shutter to be opened and closed whether manually or automatically while these elements are passing through the beam.

In the case of a circular scale occupying the whole circle it is also possible to dispense with a masking film and yet get even density by using a level of illumination such that many complete revolutions of the sensitised surface are necessary to obtain adequate exposure. If the level of illumination is such that the increase in image density between successive revolutions is sufficiently small, the illumination can be switched off or gradually reduced to zero when the exposure has reached a value to give an image density falling within prescribed limits.

This scheme is also applicable to scales of other configuration than circular, that is to say it can be applied whenever the exposure is effected by a large number of traverses of the sensitised surface and image.

FIGURE 4 shows one way in which the invention can be applied to the production of linear scales. In this case the turntable 11 is replaced by a carriage 11a moved over a guideway 11b by a precision feed screw 12a carrying a bevel wheel 34a driven from the shaft 33 as above described with reference to FIGURES 1 to 3. Instead of a feed screw any other suitable mechanism of adequate precision may be used. The carriage 11a may be automatically returned to its starting point by the aid of limit switches 44, 45 controlling the driving motor and in some cases it is possible to arrange for recording on the sensitised surface to be effected in both directions of movement of the carriage, any necessary transverse feed of the projecting system (or of the plate) being effected between the longitudinal movements of the carriage 11a.

The nature of the sensitised layer will be selected and its treatment will be carried out as known in the art to avoid the introduction of distortion, and the scale when prepared can be used to prepare further copies by contact photography in the known manner.

We claim:
1. Apparatus for forming circular scales from a linear strip by photography comprising: an apertured strip guide; digital means continuously transporting a linear strip over the guide, which strip includes spaced markings representing at least part of the scale to be produced; a rotatable plate carrier having means for supporting a circular photographic plate; toothed gearing and final drive means coupling the digital means and the plate carrier and continuously rotating the plate carrier at a predetermined speed in relation to the linear speed of the strip; means illuminating the guide aperture and the part of the strip over the guide; an optical system positioned to cast an image of the aperture and strip part on the photographic plate at a reduction ratio of at least 20:1, a circular scale being thereby formed, the optical system including a movable projection lens and means for moving the projection lens radially relative to the plate carrier and the axis of rotation of the carrier to enable formation of at least one other circular scale, the width of the illuminated aperture being limited such that any point on the illuminated part of the strip has substantially no motion relative to the motion of the plate carrier.

2. Apparatus according to claim 1 wherein the width of the illuminated aperture is determined by the relation wherein motion of the illuminated part of the strip relative to the motion of the plate carrier is no more than $100xm/a$ percent, wherein $m$ is the reduction ratio, $a$ is the aperture width, and $x$ represents a spread of the boundary of transition between opacity and clearness in the image.

3. Apparatus according to claim 1 wherein the digital means comprises a sprocket.

4. Apparatus according to claim 1 wherein the guide defines a curved contour in the direction of transport of the linear strip and means for guiding the edges of the strip during the transport.

5. Apparatus according to claim 1 wherein the means for moving the projection lens includes a carriage adjustable radially relative to the plate carrier, the said carriage holding the projection lens.

6. Apparatus according to claim 1 wherein the apertured strip guide and plate carrier are arranged horizontally, the illuminating means directing a beam vertically on the guide, and the apparatus further comprises mirrors folding the beam between the strip guide and the projection lens.

References Cited in the file of this patent

UNITED STATES PATENTS

| | | |
|---|---|---|
| 2,102,708 | Howle | Dec. 21, 1937 |
| 2,300,803 | Pattee | Nov. 3, 1942 |
| 2,382,617 | Del Riccio | Aug. 14, 1945 |
| 2,715,862 | Moyroud et al. | Aug. 23, 1955 |
| 2,758,504 | Tindale | Aug. 14, 1956 |
| 2,760,404 | King | Aug. 28, 1956 |
| 2,830,491 | Domeshek | Apr. 15, 1958 |
| 2,839,960 | Jones | June 24, 1958 |
| 2,862,818 | Tyler et al. | Dec. 2, 1958 |
| 2,917,985 | Williamson | Dec. 22, 1959 |
| 2,933,031 | Friedel | Apr. 19, 1960 |

UNITED STATES PATENT OFFICE
CERTIFICATE OF CORRECTION

Patent No. 3,101,646                          August 27, 1963

Edwin Reginald Dymott et al.

It is hereby certified that error appears in the above numbered patent requiring correction and that the said Letters Patent should read as corrected below.

In the grant, lines 3 and 12, and in the heading to the printed printed specification, lines 5 and 6, for "National Research Corporation" read -- National Research Development Corporation --.

Signed and sealed this 3rd day of March 1964.

(SEAL)
Attest:
ERNEST W. SWIDER

EDWIN L. REYNOLDS

Attesting Officer

Acting Commissioner of Patents